United States Patent [19]

Moore

[11] 3,993,268

[45] Nov. 23, 1976

[54] BALLOONED, STOL AIRCRAFT

[76] Inventor: Alvin Edward Moore, Manini Way, Diamondhead, Rte. 1, Bay St. Louis, Miss. 39520

[22] Filed: May 19, 1975

[21] Appl. No.: 578,618

[52] U.S. Cl. .......................................... 244/5; 52/2; 244/26; 244/119; 296/28 J; 296/31 P
[51] Int. Cl.² ........................................... B64C 1/34
[58] Field of Search ............... 244/5, 25, 26, 29, 30, 244/119, 125–128; 52/2; 180/30; 296/28 R, 28 J, 31 R, 31 P

[56] References Cited

UNITED STATES PATENTS

| | | | |
|---|---|---|---|
| 3,443,776 | 5/1969 | Moore | 244/5 |
| 3,559,920 | 2/1971 | Moore | 244/5 |
| 3,559,923 | 2/1971 | Moore | 244/5 |
| 3,801,044 | 4/1974 | Moore | 244/5 |

Primary Examiner—Trygve M. Blix
Assistant Examiner—Galen L. Barefoot
Attorney, Agent, or Firm—Alvin Edward Moore

[57] ABSTRACT

A winged aircraft, adapted to takeoff and land with its longitudinal axis at a very steep angle of inclination, including: balloons that have a center of buoyancy forward of the center of gravity and tend to turn the craft into the said steep angle; a controllable-thrust stern-elevating propeller in an upright wind tunnel, having a lift rearward of the center of gravity that in horizontal flight balances the torque of the balloons; and an elongated, stiffly resilient body frame of a multiplicity of inflated small tubes extending in the fore-and-aft direction, supported by longitudinally spaced, rounded ribs, disks or the like. This frame is round in the middle and somewhat streamlined at each end, its stern portion rearwardly sloping downward at its top and upward at its bottom. The assembly of tubes, preferably extending from the foremost to the rearmost parts of the frame, is flattened into substantially linear, horizontal shape at the rear portion. Landing gear, adapted to be on the ground while the vehicle's nose is well clear of the ground, conforms to the bottom upward slope of the tubes; this slope being at an angle to the horizontal which provides the desired takeoff and landing attitude with all landing wheels on the ground. The ribs or disks are preferably spirally wound convolutions of inflated tubes or concentric tubes on a central round core which may contain a door. The vehicle has ferris-wheel-like seats, swinging from upper pivots.

21 Claims, 16 Drawing Figures

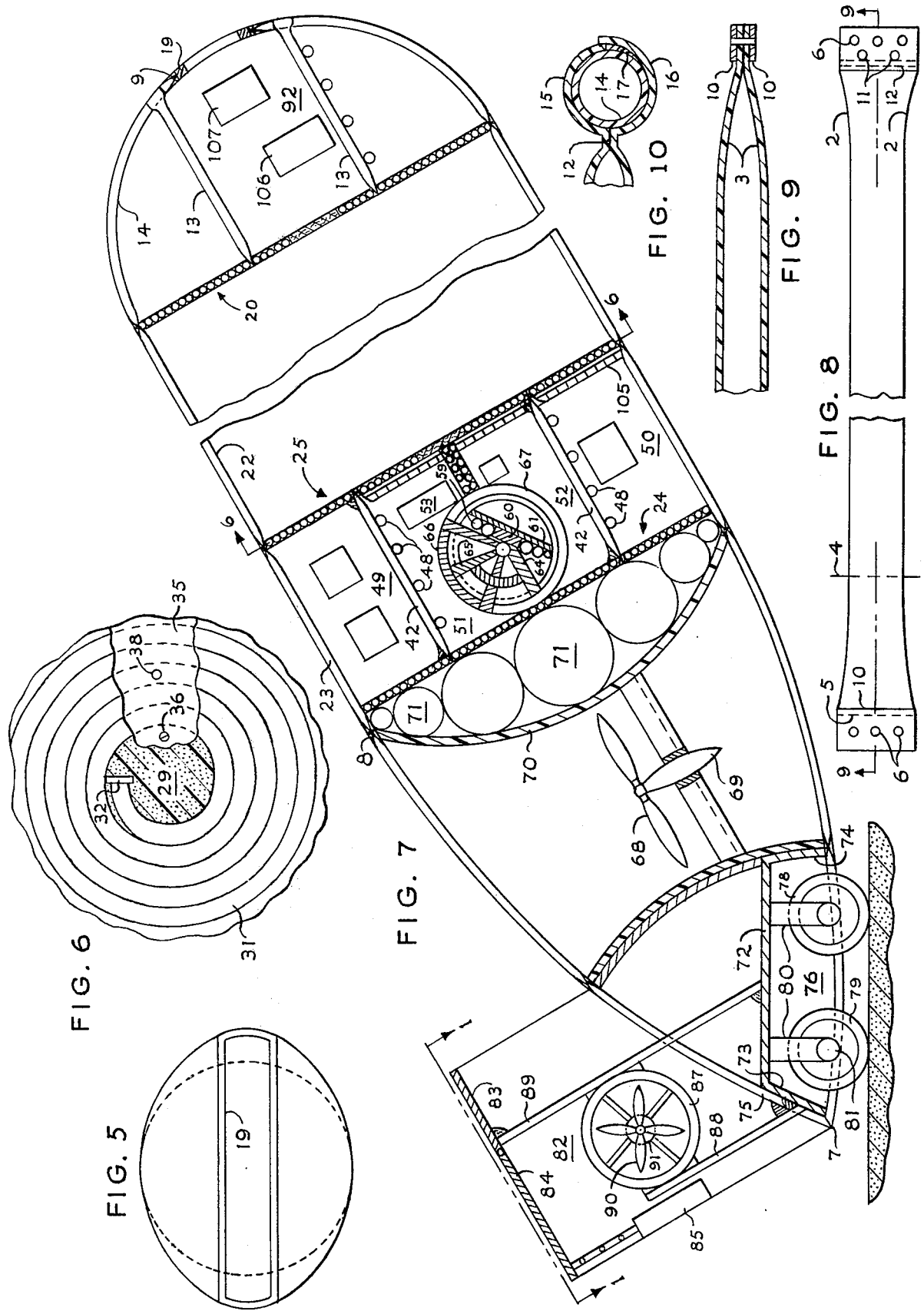

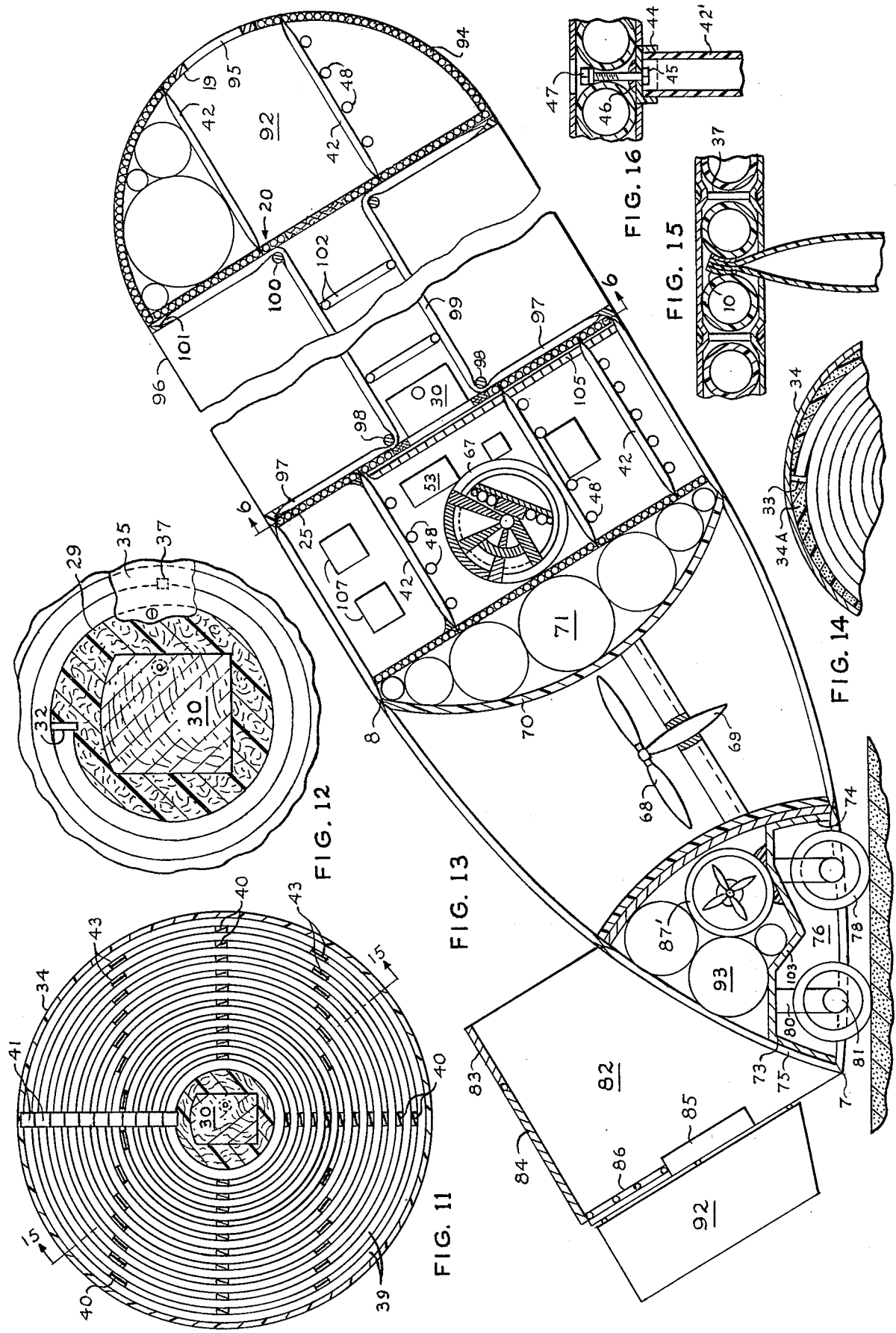

BALLOONED, STOL AIRCRAFT

In some respects the present invention comprises an improvement of the inventor's prior U.S. Pat. No. 3,801,044. Some objects of this invention are to provide: (1) an elongated, stiffly resilient, preferably slightly heavier than air vehicle, not subject to wreckage by major wind turbulence, having balloons and a resilient body frame and skin; (2) such a vehicle having balloons with a center of aerostatic lift that is forward of the center of gravity and having a resilient frame of stiffly flexible inflated tubes which extend approximately or nearly the full length of the craft, these tubes being bent toward the longitudinal axis of the vehicle at its nose and stern and supported by a plurality of rounded, longitudinally spaced elements that are athwart this axis; (3) a vehicle as in (2) above in which the tube-supporting elements comprise convolutions of inflated tubes, arranged on a central disk-like core, this core optionally containing a door; (4) a vehicle as in (2) above, in which the elongated tubes slope in a rearward direction downward at the top of the vehicle's stern and upward at its bottom, this slope being adapted to substantially conform to the fore-and-aft positions of the rotary axes of landing-gear wheels. Other objects will be apparent in the following specification and accompanying drawings.

In these drawings:

FIG. 1, partially broken away is a top plan view of the invented vehicle, this view being substantially from the plane indicated by the arrows 1—1 of FIG. 7;

FIG. 5 is a front elevational view of the front end of the craft of FIG. 2, its rear part, comprisings wings and propellers, being broken away as in FIG. 2;

FIG. 6 is a fragmentary view of an optional form of partition for supporting the elongated tubes, part of its enveloping skin being broken away to illustrate the partition frame in section from the plane indicated at 6—6 in FIG. 7 or FIG. 13;

Figure 1:
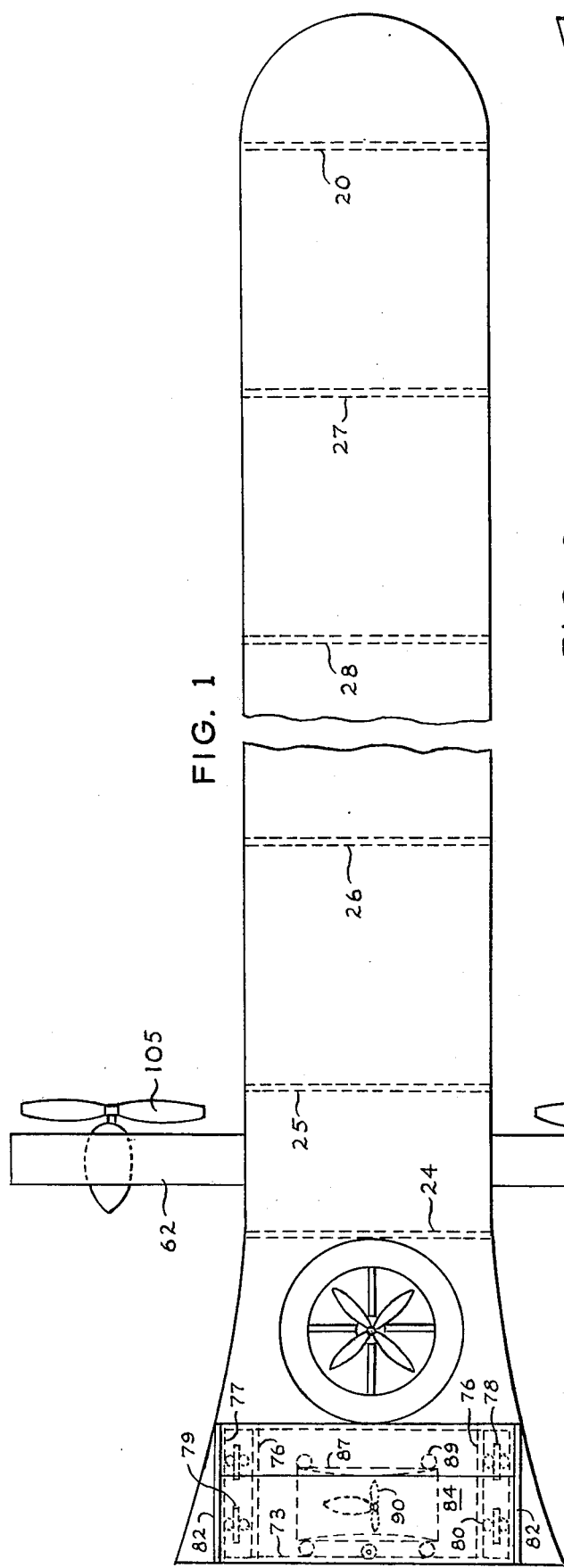
Figure 2:
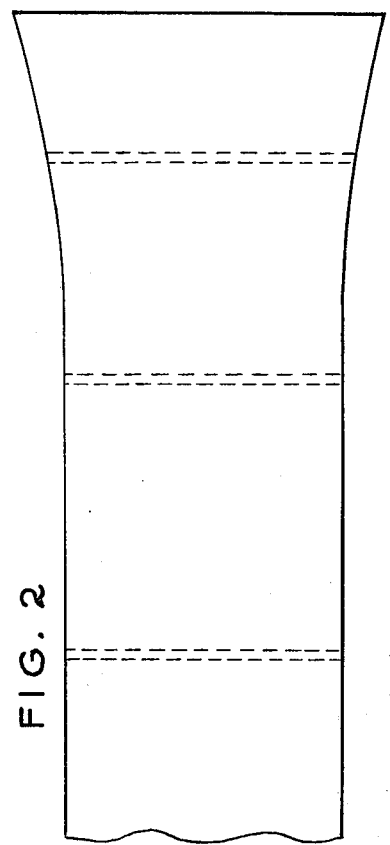
FIG. 2 is a fragmentary top plan view of the forward portion of the type of craft shown in FIG. 1, but illustrating an optional laterally flared nose of the vehicle.
Figure 3:
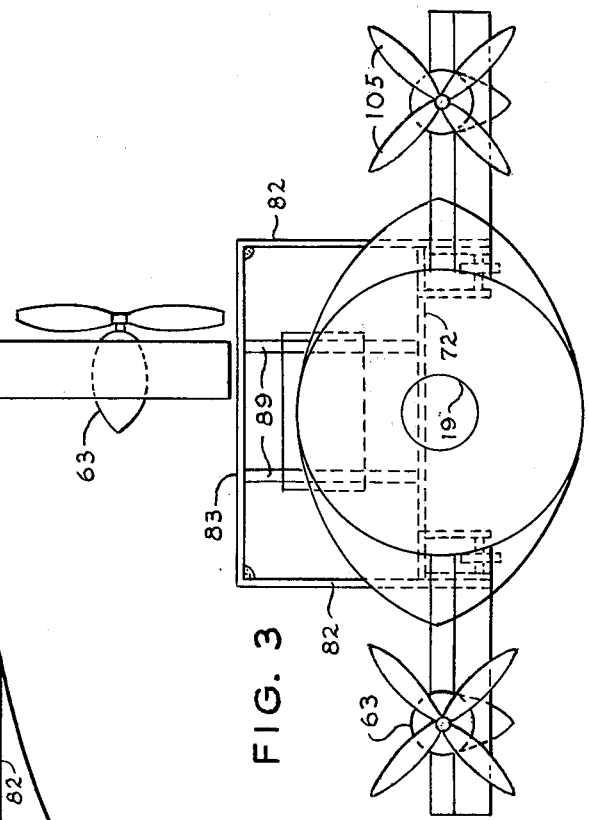
FIG. 3 is a front elevational view of the craft of FIG. 1.

FIG. 7, partially broken away and on a scale enlarged from that of FIGS. 1 to 3, is a view in section from a vertical plane approximately at the longitudinal axis of the vehicle of FIG. 1;

FIG. 8 is a detail view, partly broken away, of one of the elongated inflated frame tubes;

FIG. 9 is a sectional view from the plane 9—9 of FIG. 8;

FIG. 10 is a fragmentary, sectional view of a joint at the nose of the craft between one of the frame tubes and a floor tube;

FIG. 11 is a fragmentary, sectional view from the plane 6—6 of FIG. 7 or FIG. 13, showing an optional form of frame-tube-supporting partition;

FIG. 12 is a sectional view from a plane comparable to that indicated at 6—6 of FIGS. 7 and 13, showing another optional form of partition;

FIG. 13, similar to FIG. 7, is a sectional view partly broken away, of a vehicle having an optional body frame that has its middle part surrounded by the balloon or balloons;

FIG. 14 is a fragmentary, sectional view of a partition of the type shown in FIGS. 6 and 12, showing on a reduced scale the outer, peripheral portion of this partition;

FIG. 15 is a fragmentary, sectional view from a plane like that indicated at 15—15 in FIG. 11 of a joint between one of the elongated frame tubes of FIG. 7 or FIG. 13 and a tubular part in the nose portion of the vehicle; and FIG. 16 is a fragmentary, sectional view of another, optional form of such a joint.

In each of the forms of the invention shown in FIGS. 1, 2, 7 and 13: the center of lift of the balloons is forward of the center of gravity of the craft; and the inflated frame tubes extend from a point at or near the nose of the vehicle to its rearmost part. These tubes, shown in detail in FIGS. 8 and 9, may be of metal (for example, of thin aluminum); but they preferably are of plastic. Currently, chlorinated polyvinyl chloride, polypropylene or polyethylene tubing, one-eighth to one-half inch in diameter, commercially sold and used for conveying liquids, is preferred. They are inflated with air, helium or other gas at a pressure in the range of 5 to 10 pounds per square inch — preferably 6 to 8 pounds — via tire-type valves in either each individual tube or via a round manifold tube that is fitted with such a valve and has ports connected to the overlying, curvingly arranged set of frame tubes. Each tube optionally may have at each end an end cap or an elbow fitting connecting the tube to an adjacent tube, these end caps or elbows being bonded to the tube by fusion welding or plastic-solvent welding in known manner or by epoxy putty. But preferably the tubes are of the type, shown in FIGS. 8, 9, 10 and 15, which have flattened and sealingly bonded ends.

FIGS. 8, 9 and 10 show two types of such flattened ends. In each case, the tube has a middle part that is circular in cross section; and from this middle portion it curvingly tapers to sealed flat ends, with pairs of outward tapers, 2, on two of its sides and pairs of inward tapers, 3, on its other two sides. The length of these curved tapers, from the plane 4 to the band 5—10 of the glue (or welding or solder) of the flattened end depends on the diameter of the circle of the middle tubular part. The ratio of the taper length to the diameter is the same for all tube diameters and may be exactly determined by mathematical calculations. The length of this taper has been roughly and empirically ascertained to be over two times the diameter. The width of the major dimension of the flat band 5 of each flattened tube end is approximately 1.57 times this diameter. When the tube is thermoplastic each of these flattened, sealed end portions may be formed by the following method: (1) slitting the tube on each side a distance from its end equal to the desired flattened-band dimension along the tube's axis; (2) liberally coating the adjacent surfaces of the two slitted plies with plastic-solvent cement; (3) clamping the plies together in a clamp having planar jaw surfaces that completely cover the plies; (4) after the welding reaction is complete, releasing the clamp. Optionally, step (1) above may be omitted, and the cement of step (2) of the method is then poured or injected into the upwardly turned end of the tube. Also optionally, the following step may be added to this method, before step (1): inserting into the tube, under pressure or by gravity, light-weight insulation — for example ground or shredded foamed plastic or tiny foam-plastic pellets. The final gaseous material in the tubes thus would be a mixture of air or other gas under above-atmospheric pressure and light-weight insulation.

The holes 6 are optional; they may be used for attachment of one tube end to another (at the rear vehicle-frame line 7, FIGS. 7 and 13, or of a tube end 8 to the upright wind tunnel, or of a tube end 9 to the plexiglass windshield frame or to any other frame of a window or door.) Each of the flat ends is preferably thickened and reinforced by a pair of metal or strong-plastic bands, 10. bonded by epoxy putty, silicone-rubber cement, welding or other bonding material to outer surfaces of the two tube-flattened plies. The flattened ends may be thus sealed and reinforced by: (1) placing silicone-rubber cement, epoxy putty or the like between the two plies; (2) coating one surface of each of the metal bands 10 with silicone-rubber cement, epoxy putty or other bonding material, and placing these surfaces on outer sides of the plies (alternatively, the bonding material may be placed on these outer sides before joining them to the bands); (3) drilling the holes 6 and/or 11; (4) riveting or bolting the metal bands and plies together, for example, through the central one of the holes 6 or through an optional pair of additional holes, 11. The holes 6 and 11 may be drilled after the glue or other bonding material has set. The flat tube ends may be forked as illustrated in FIG. 10 by slitting the tube outside of a narrow band 12 of the glue, solder (if the tube is metallic) or other bonding material. This forked type of tube end, preferably reinforced by the plates 10, is optionally used in forming a joint between intersecting tubes — for example between the inflated floor-support tubes 13 and the bent portions 14 of the inflated vehicle-outlining tubes. The parts 15 and 16 of each fork are wrapped around 14 and bonded in place by epoxy putty, silicone-rubber cement or other bonding material, 17; and optionally they also may be bolted or riveted together through the holes 6.

Figure 4:
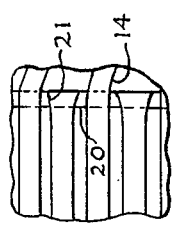
FIG. 4 is a fragmentary view of a portion of the tubular frame, illustrating an optional arrangement of the tubes near the nose (or stern) of the vehicle.

The currently preferred form of the invented aircraft, shown in FIGS. 7 and 2 and optionally illustrated in FIGS. 1 and 3, has outer frame tubes that extend from the windshield frame 19 to the rearmost portion 7 of the vehicular body. This frame 19 may be of metal, molded, fiber-reinforced plastic or wood, and its preferably rounded form may be circular, as indicated in FIG. 3, or oblong (elliptical, rectangular, or having two straight and two curved sides as in FIG. 5). When its perimeter is less than that of the middle part of the craft and, as is preferable, the vehicle-outlining frame tubes are closely juxtaposed, some of these tubes stop at the front partition (or rib) 20. As indicated in FIG. 4, every other one of the tubes has a flattened, sealed end 21 that is fastened by epoxy putty or silicone-rubber cement and/or the forked portions 15 and 16) to the front partition or rib 20, and the other tubes have forward portions 14 that extend beyond the elements 20, to the frame 19. This arrangement permits fairly close spacing of the middle portions of the body tubes and use of a windshield having a perimeter that is substantially less in measurement than that of the vehicular body. Instead of thus eliminating every other one of the nose portions of the elongated tubes, two such portions may be eliminated for every one that goes beyond the elements 20, to the frame 19 — thus permitting close spacing of the frame tubes and the streamline-facilitating type of windshield frame 19, shown in FIG. 3. The plexiglass windshield in each instance is outwardly curved to also facilitate streamlining and preferably comprises two parallel transparent elements.

As indicated in FIGS. 3 and 5, the middle part of the vehicular body is preferably circular in cross section. As illustrated in FIG. 7, the middle portions 22 of the body tubes are coaxial continuations of the portions 23 of the tubes. These portions 22 and the skin around them enclose the lighter-than-air aerostatic means. This means may comprise a separate-skin-enveloped balloon or plurality of balloons, but the inventor's current preference is to confine helium or other lighter-than-air gas directly within the annular assembly of tube portions 22 and their substantially airtight skin and between bulkheads or partitions which also are substantially airtight. The gas is inserted via a pneumatic valve. Preferably, each balloon contains a flexible ballonet, and pump-and-tube means are provided for supplying air to the ballonet or evacuating air from it.

As illustrated in FIGS. 1 and 2, the elongated craft has numerous body-strengthening tube-supporting, transverse elements, and of these at least the forward element 20 and the two rearward elements 24 and 25 are disk-like partitions. All the load-carrying compartments have such bulkheads. Preferably, such load-holding chambers include those between pairs of the partitions 24, 25, 26, 27 and 20; and between the partitions 26 and 27 there are numerous body-strengthening, tube-supporting elements of the aerostatic portion of the vehicle, mostly in the middle body part which is shown as broken away, one of these elements being illustrated at 28. Each of these middle elements optionally may be a center-holed rib and comprise one or a few concentric rings of inflated tubes, each joined into an endless loop by a coupling or sleeve. But since such a rib is weaker than a disk-like bulkhead and permits undesirable gas-compacting flow of the lighter-than-air gas, these middle elements 28 and the like are preferably airtight bulkheads like the partition of FIGS. 6 and 14, or the one of FIG. 11 without its central doorway. Each of these disk-like bulkheads comprises nested convolutions of inflated plastic or thin-metal tubes.

In the partition of FIGS. 6 or 12, these convolutions are portions of a tube that is spirally wound on a disk-like core. In FIG. 6 this core, 29, is shown without a doorway and is of the type preferably used at and between the ends of the aerostatic means. Optionally the core of each of FIGS. 6, 11, 12 and 14 may be made of ⅜-inch, ½-inch or ¾-inch plywood, "Masonite," parallel aluminum plates that are welded to a peripheral strip, or molded foamed plastic of a relatively dense and strong type. When the partition provides access to a load-holding compartment (for example, the bulkhead 20 or 25 when it is a wall of a load-carrying compartment) a doorway and door 30 are provided. On the core 29 of FIG. 6 or FIG. 12, an inflated tube 31 is spirally wound.

This tube, which is preferably of plastic and one-fourth to one-half inch in diameter has a cap 32 that is sealed on the inner end of the pipe by one of the known joining techniques. When, as is preferable, the tube is of polypropylene or chlorinated polyvinyl chloride plastic or the like, these techniques are: solvent welding; fillet welding; fusion welding; and provision of flanged joints. The inventor currently prefers to join these tubes and end caps, as well as the tubes and fittings of FIGS. 11 and 16, by fusion welding, which produces a tight joint that is nearly always permanently leakproof and is stronger than the pipe used. In the rare instances when a leak might occur in pressure testing the joint is back-welded, providing one or more beads of fillet welds on the tube at the fitting. The cap 32 is securely glued by silicone-rubber cement or other glue to an abutment which has been molded, cut or otherwise formed in the peripheral portion of the core.

On the tube's other end (illustrated in FIG. 14) a second cap, 33, is similarly sealed. This cap is securely fastened to the adjacent, radially inward convolution by fillet welding, producing welded fillets between the cap and this convolution. And optionally the outer tubular convolution may be tied to the next inward convolution by a loop of wire with twisted-together ends.

Around the periphery of the spirally wound tube a narrow annular band 34 of thin strong plastic, nylon cloth or thin, apertured aluminum or thin steel is fitted and glued. Optionally, this band may be of apertured pipe strap, which as commercially sold is three-fourths of an inch wide, in which event the ends of the pipe strap are fastened together by rivets or small bolts extending through registering holes of the strap. Preferably, epoxy putty or other cement (for example, rubber cement of the Pliobond type) mixed with fine, light-weight aggregate is placed in the clearances between the band and tube as indicated at 34A.

For those partitions (28 and the like) which are to be in the middle of the aerostatic part of the craft an annular skin 35 is preferably glued on each side of the nested tubular convolutions, the glue utilized also serving to strengthen and fasten the convolutions together. The skins are also fastened to the core 29 by screws 36; and optionally the opposite pair of skins may be tautly connected by small-diameter bolts or wire loops with twisted-together ends (37 in FIGS. 12 and 15) between tubular convolutions, and faired over by epoxy putty or the like. The skins are preferably stiffly flexible, and may comprise painted cloth, thin sheets of plastic or aluminum, or aluminum or plastic screening that is trowel-plastered with a thin coating of epoxy putty, mixed fine, light-weight aggregate and rubber cement of the Pliobond type, or the like. Compressed air or helium under a pressure in the range of five to ten pounds per square inch is supplied to the tube via the pneumatic valve 38.

For those partitions of the floor-supporting type, for instance 24, 25 and 20, a skin 35 (FIGS. 6 and 12) is applied on each side of the tube, but only in segments, with gaps between the skin sections for any door that is necessary and for insertion of the later described floor-supporting tubes.

In the type of partition shown in FIG. 11 the core also optionally may be solid or have a door. This bulkhead comprises numerous concentric tubes 39 of plastic or thin extruded aluminum, glued together by the bits 40 of epoxy putty, silicone-rubber cement or other bonding material. The ends of each tube are held together against inflation pressure by a coupling 41. These couplings are drilled to provide a small gas passage between each pair of adjacent couplings and one of them is drilled on its side to provide a hole in which a pneumatic valve, similar to 38, is fastened by glue or other bonding material. The couplings are fastened together by fillet welding, being careful not to block the gas passages but to insure a thorough seal around the holes. The annular band 34 and skin means of the above-described type, illustrated at 35, complete this partition. When it is to support floor tubes 42 the skins have adjacent straight edges that provide a gap between them which provides spaces for formation of joints between the assembly of tubular convolutions and the floor tubes. An optional type of these joints, usable in the partition of FIG. 11 or of FIGS. 6, 12 and 14, is illustrated in FIGS. 11 and 15. Preferably the flattened tube ends 43 (FIG. 11) are longer than they are illustrated in FIG. 15 — long enough to be very securely wrapped and fastened to an adjacent tubular convolution by epoxy putty or other strong bonding material. When the partition comprises the spirally wound tube of FIG. 6 or FIGS. 12 and 14 the inflation gas is sufficiently evacuated from the spiral tube to permit insertion of the flattened tube ends between convolutions; and after all the floor tubes are in place the tube is re-inflated to the desired pressure.

Another optional type of joint between a partition and floor tubes is shown in FIG. 16. The floor tube 42' is closed at each end by an end cap 44 that is similar to the caps 32 and 33 and is sealingly fixed to the tube in the above-described manner. Before it is thus positioned a hole is drilled in it and the bolt 45 is inserted in the hole and sealingly glued in place by the mound of epoxy putty, welding or other bonding material 46. In assembly of this tube-end structure and the bulkhead of FIGS. 6, 12 and 16 or of FIG. 11, the bolt is placed between tubular convolutions of the partition. A washer or other apertured metallic element that is wider than any clearance between the convolutions is placed through a skin opening and over the threaded bolt end, and the nut 47 is screwed on the bolt, tightly against the washer or the like. Optionally, a bit of epoxy putty may be placed over the nut and washer.

A third optional variation of the joint is indicated in FIG. 10. The forked plies 15 and 16 are divided and then forced around a tubular convolution by a putty knife or other appropriate tool, and the ends of the overlapped plies are fastened together by the bonding material 17 and/or rod-like elements (bolts or rivets or wire loops with twisted-together ends) extending through holes like those shown at 6.

Each floor is completed by: tautly placing and bonding skins to the top and bottom surfaces of the tubes (42, 13), these skins being of the type of materials described above in connection with the skin means 35; and placing below the floor skins and tubes the transverse floor-bracing tubes 48, which have tube ends similar to those of the tubes 42 and are similarly fixed to sidewall portions of the tubular elements 23.

The rear part of the aircraft includes the steering and stern-elevating means, the landing gear, and the body section which supports the wings and propulsion structure. This body section comprises the upper and lower windowed compartments 49 and 50 and the middle compartments 51 and 52 (or optionally as indicated in FIG. 13, a single middle compartment). A pair of doors 53, preferably windowed, are in the sidewalls of the compartment 51; and one or a pair of small windows are in the sidewalls of 52. The tubular wing spars, of different diameters which conform to the airfoil surfaces, inflated with air or helium, preferably extend thru parts of the compartments 51 and 52. These spars comprise the tubes 59 which extend entirely across the width of the body and two other, central-wing tubes at each side of the compartment 52 (not shown) which are fixedly joined at tube ends to the bar, block or hollow element 60. This element 60 is welded to the plate 61; and to this plate all the wing tubes are fixed by epoxy putty or other bonding material. Preferably the wings 62 and engines 63 are rotatable by a fluid or electric motor. This motive means as exampled in FIG. 7 or 13 comprises a bar 64 which is welded to the element 60 and also welded to an arcuate piston rod. This rod is welded to the rectangular piston 65 of the wing-rotating fluid motor. The fluid-motor housing 66 is fixed to the floor of compartment 51; and the tubular spars and plate 61 are fixed at each sidewall to a ring which rotates in the large-diameter bearing 67 that is sealingly mounted in each sidewall and encircles this ring. The wings 62 are preferably a little rearward of the center of gravity of the vehicle.

The stern-elevating propeller or fan 68, controlling the pitch attitude of the vehicle in flight, is rotated by the motor 69, which may be powered by electricity from a generator and batteries, or by fluid pressure from a hydraulic or pneumatic pump; or the motor may be of the internal combustion type, burning gasoline or other fuel. Air is driven by the propeller 68 from the top to the bottom of the vehicle via the wind tunnel 70. This upright tunnel may be made of molded fiber-reinforced plastic, or of molded sections of plastic, fastened together at contacting edges, or of an inflated tube that has been spirally wound around a properly shaped fixture, with the convolutions welded or glued together. Auxiliary balloons 71 are positioned in all the spaces between the wind tunnel and the adjacent partition and sidewall portions.

The assembly of frame tubes is flattened at the rear end of the frame into the substantially straight frame line 7, which includes the numerous shorter lines of the flattened rear ends of the multiplicity of individual tubes. This rear frame edge 7 necessarily has a length at least equal to the product of 1.57 times the tube diameter times the number of tubes in the frame. Otherwise, there would not be room at the edge 7 for all the flattened tube ends.

If there were no forcible bowing outward of the stiffly resilient tubes between the frame edge 7 and the rearmost bulkhead 24 these tubes would automatically and streamlinedly arch backward in a long taper. But since the currently preferred diameter of the ballooned craft is very large this taper of the rear frame part may be too long for practical present-day use of the vehicle — for example over 50 feet for a vehicle of about 24 feet in diameter. Therefore, the upright wind tunnel 70 and the combined landing gear and steering structure are constructed and arranged to support the portions of the tubes between 7 and 24 in curves that are bowed outward from their natural resilient-tube arcs. These portions of the tubes thus have larger gaps between them than the tube parts at either the edge 7 or the partition 24. Preferably the tubes are so spaced at the annular part of the body frame that their flattened rear ends at the line 7 are either in edge contact or slightly spaced from each other. At the edge 7 there is preferably placed at least one elongated, apertured, thin-metal bar or strip (for example, of pipe strap) between the flattened portions of the lower and upper tubes; and the small bolts or rivets and glue which pass through holes 6 and fasten these portions together also pass through the apertures of the strip, or of the upper and lower strips if a pair of them are used.

The combined landing gear and steering structure includes:

1. The wheel-supporting box, fastened to the rearward upright line of the wind tunnel 70 by bolts and epoxy putty or other bonding material. This structure is preferably of metal and its upper horizontal plate 72 extends nearly the full width of the vehicle's stern. The upright plates 73 and 74 are integrally fixed or welded to the entire left and right edges of 72. The plate 73 is curved to streamlinedly fit lower surfaces of the rear portions 75 of the upper tubes, and these portions are fastened to it by epoxy putty or other bonding material and preferably also by an elongated piece of pipe strap and small bolts that extend through holes of the pipe strap, between tubular portions and through holes drilled in the plate 73. Each fore-and-aft pair of the wheels are partially housed within four upright elements: parts of the transverse plates 73 and 74; and the fore-and-aft sidewalls 76 and 77. The forward wheels 78 are pivoted for aid in steering on the ground; and the rear wheels 79 rotate in planes that are fixed with respect to the longitudinal axis of the vehicle. Shock absorbers and bearings of any selected known design are schematically indicated at 80 and 81.

2. The rear attitude-controlling structure includes: a pair of tail fins 82; an in-flight-horizontal stabilizer 83; an elevator 84, pivotally mounted on the rear edge of 83, especially of use in an emergency when the propeller 68 and motor 69 are not functioning, controllable by the fluid motor 85 and pivoted linkage 86; a vehicularly transverse wind channel 87, made like the above-described wind tunnel 70; posts 88 and 89, supporting the channel 87; a steering propeller 90; an electric or fluid motor 91; and, in each form of the vehicle of FIGS. 7 and 13, an optional pair of rudders 92 of known type, pivotally mounted on rear edges of the upright tail fins 82, usable in the unlikely event of failure of the propeller 90 and motor 91. Optionally also, there may be an auxiliary pair of elevators (planes), pivoted in the opposite sidewalls 92 of the nose portion of the craft, controllable by a fluid motor on the inside of each of these walls.

The rearmost compartment, of which the plate 72 is the floor, may be used to house additional balloons, of the general type shown at 93 in FIG. 13; or baggage, freight, or other load may be placed in it. When passengers (including a mechanic) are seated (on ferris-wheel-like seats, swinging from pivotal bearings supported by a cross bar between the lower portions of the fins 82) small windows may be placed in the tubular sidewalls, opposite view-ports in these lower portions. In all passenger-carrying and crew compartments ferris-wheel-like seats are provided.

Although the preferred form of the vehicle is shown in FIS. 3 and 7, some optional variations of the invented structure are illustrated in FIG. 13. The hemispherical bow of FIG. 13 comprises an inflated tube, the convolutions 94 of which are fastened together in the general manner of FIG. 11 or of FIGS. 12 and 14; but these convolutions are hemispherically arranged on a bowl-like fixture, and in place of the door 30 of FIGS. 11 and 12 the dual-pane, outwardly curved windshield 95 and its frame 19 is sealingly fixed. Each convolution optionally may be a turn of a spirally wound tube of the type of FIGS. 12 and 14 or an annular ring comprising a coupling-joined tube, as in FIG. 11.

In FIG. 13 the aerostatic means is shown as having an outer, cylindrical, waterproof skin 96, which is a part of the overall skin of the vehicular body, which may comprise: two-coats-painted nylon or ballon cloth; flexible balloon plastic; or plastic or aluminum screening stuccoed with a thin coat of epoxy putty or other pasty glue and well painted. The aerostatic means may be divided into two or more balloon compartments by partitions of nylon or balloon cloth or balloon plastic-sheeting, these partitions being sealingly fastened to the inner tubular-frame structure. This structure is formed by: flattening all the longitudinal tubes at the periphery of the bulkhead 25; strapping or wiring each flattened portion to the outer convolution of the partition 25 and fairing over the joint with epoxy putty or other bonding material; bending the properly spaced tubes into radial portions, 97; bending and partly flattening the tubes within the metallic or reinforced-plastic ring 98; bending the portions 99 of the tubes at and within the similar ring 100; strapping or wiring and/or epoxy-puttying the flattened ends 101 of the tubes to the periphery of the partition 20; optionally providing inner and outer frame-reinforcing skins of plastic sheet or flexibly stuccoed screening on radially inner and outer surfaces of the tubular portions 99; and bonding the reinforcing rings 102 to the inner cylindrical skin on the tubular portions 99 — or in the absence of such skin to these portions.

The landing gear and attitude-controlling structure of FIG. 13 is similar to that of FIG. 7 but has the following variations (which optionally may be present in the form of either FIG. 7 or FIG. 13); The wind channel 87' and the steering propeller and motor are within the tail part of the body frame and fixed to and supported by lower portions of the fins 82, these fins being apertured for insertion of the channel 87' in fin holes. And the floor 72 optionally has the angled portion 103, when optional balloons, 93, are placed in the rear compartment.

The steering motor-and-propeller serve two purposes. One is for steering the vehicle; and the other is for counteracting the tendency of the stern-elevating propeller's torque to turn the craft about an upright axis. Because the lift of the wings 62 is preferably slightly to the rear of the center of gravity they provide much of the necessary stern elevation during horizontal flight.

OPERATION

The center of aerostatic buoyancy tends to hold the vehicle in the air at a predetermined very steep angle — for example of 50°. In flight this tendency is opposed and controllably overcome by pilot's control of the stern-elevating propeller, aided by the lift of the wings in horizontal flight, and at times by the elevator 84. On the ground this angle of inclination is lessened because of the greater moment arm between the rear wheels 79 and the center of buoyancy than the moment arm between this center and the forward wheels 78. And on the ground the nose of the craft may be pulled down until it is in horizontal position by a cable or rope carried in the pilot's forward compartment and a winch on the ground. The pilots also have available a rope ladder for use in disembarking from the high nose portion of the vehicle when it has landed at a place where no mooring facilities for this type of craft are present. And fixed ladders (105) may be provided in any of the compartments.

After the vehicle is loaded with freight and/or passengers the wings and propellers 105 are rotated until the wings are in a non-stalling but steep-climbing angle, a short run is made, the stern-elevating propeller 68 is rotated faster, the rear end is thus pulled off the ground, and the climb continues. At the desired cruising level the power of the motor 69 is further increased; and the pilot optionally may also actuate the fluid motor 85 to pull downward the rear edge of the elevator 84; and he rotates the wings into the proper angle of attack for forward flight. The ship is thus leveled off. As it increases forward speed the lift of the wings, which are a little abaft the center of gravity, increases, the elevator 84 may be returned to its position of FIG. 7 (or FIG. 13), and the speed of the stern-elevating propeller 68 is decreased.

In preparing to land, the motor 69 is stopped or nearly stopped, and the center of buoyancy, being now over or nearly over the center of gravity, forces the craft into a very steep, predetermined angle of inclination — for example, at about 50°; and the wings and main propellers 105 are rotated until the propeller disks are optionally horizontal, or make a slight angle to the horizontal which insures very slow forward motion. The craft, which is only slightly heavier than air — especially after much of its fuel has been burned — now slowly settles, the speed of its downward movement being controlled by the pilot's adjustment of the speed of the main propellers 105.

A little before the vehicle touches down the pilot increases the speed of the stern-elevating propeller, which pulls up the rear end of the vehicle until it is in the approximate attitude in pitch of FIG. 7 or FIG. 13. The craft lands on its rear wheels in this position, with a very short run.

In an emergency landing when the main engines have failed: the main propellers 105 are unclutched and pitch-changed for autorotation; the wings and main propellers are rotated into maximum non-stalling angle of attack of the wings, while the longitudinal axis of the vehicle is at an inclination to the horizontal of, say, 40°; the stern-elevating propeller 68 is rotated for sufficient thrust to hold the craft at this angle; and it slowly glides down into landing.

When the stern-elevating propeller also has failed, the elevator 84 is set for its maximum lift, and the light-weight craft glides down with its wings at a rather steep angle of attack.

Variations of the specific structure disclosed may be made without departing from the principles of the invention. For examples: (1) The frames of the outside, curved, preferably windowed doors 53 and 106 and of the outwardly curved windows 107 may be of pressed wood, Masonite, arcuately sawed plywood or curved, extruded aluminum channels, and the tube ends at these windowed openings may be closed either by sealed end caps or sealed tube-flattened elements. When they are provided with end caps they preferably have bolts like those shown at 45 in FIG. 16, which go through holes of the frames and are fastened with nuts at their inner surfaces. When, instead, the tubes are closed at the frames by flattened portions like those of FIGS. 8 to 10, these flattened ends are attached to the frames by bolts or rivets extending through the holes 6. (2) Although the vehicle is preferably slightly heavier than air, it optionally may be lighter than air, in which event the main propellers 105 are preferably of reversible pitch, and their rotary axes preferably may be turned into vertical position and a plane containing the craft's center of gravity, thus making it possible to force the lighter-than-air vehicle down in landing. (3) Optionally but not preferably: the steering propeller may be of reversible pitch; or two steering propellers in a juxtaposed pair of wind channels may be utilized, these propellers having opposite pitch angles for steering in opposite directions. (4) a small window may be placed in the floor at and between the pilot's feet, and, aligned with it for the pilot's easy viewing through both windows of the lower scene when the craft is steeply inclined, another small, outwardly curved window may be installed in the lower part of the bow wall. (5) The front-window structure and partially flattened and widened bow frame portion of FIG. 5 optionally may be turned ninety degrees from their position as illustrated in this figure, so that the longer part of the window frame 19 is vertical; this position insures a better view below by the pilot and co-pilot. (6) Instead of the engines 63 and propellers 105, jet or rocket motors may be utilized.

In the following claims, unless otherwise qualified; the term "bonding material" means welding, epoxy putty or other cement, solder, brazing, or the like; "rectangular" signifies a curvingly oblong shape or having four straight sides with two of them longer than the other two, or having two opposite straight sides and two opposite curved sides of a different length than the straight sides; and the word "gas" means air, or any other mixture of gases, or any pure gas, optionally mixed with insulating material.

I claim:

1. A vehicle, adapted to move through the atmosphere, capable of taking off and landing with its fore-and-aft axis at a steep angle of inclination to a horizontal plane, including:
    a tubular frame, comprising numerous elongated tubes having sealed tube-end portions, extending from a forward portion of said frame to its rearmost portion, arranged in an asembly around the longitudinal axis of the vehicle; gas under above-atmospheric pressure in said tubes; vehicle skin means enclosing said assembly; and tube-supporting elements within said asembly, extending transversely to said axis, comprising nested inner and outer tubular convolutions, each of said inner convolutions being within and closely juxtaposed with one of said outer convolutions, gas under above-atmospheric pressure in said tubular convolutions, and fastening means connecting the outermost one of said convolutions to said elongated tubes;
    aerostatic means, comprising lighter-than-air gas in said vehicle, having a center of aerostatic buoyancy that in horizontal flight is forward of the vehicle's center of gravity, exerting a force on the vehicle tending to raise its forward end while gravity tends to depress its rear end;
    a wind tunnel, supported by a rear portion of said tubular frame, providing a path for air from an upper vehicular surface to a lower surface;
    attitude-controlling propulsion means in said tunnel for forcing a current of air through the tunnel from the said upper surface to said lower surface, supplying a controllable amount of thrust at said rear portion in counteraction of the turning moment of said aerostatic force on the vehcle; and
    propulsion means for propelling the vehicle substantially in the direction of said fore-and-aft axis.

2. A vehicle as set forth in claim 1, in which: said frame comprises forward, middle and rearward parts; said middle part is substantially circular in cross section; and each of said tube-supporting elements includes an inner core having a substantially round perimeter and means connecting the innermost one of said inner convolutions to said core, an inner surface of said innermost convolution being contiguous to the said perimeter of the core.

3. A vehicle as set forth in claim 2, in which the said convolutions comprise turns of an inflated tube, spirally wound about said core.

4. A vehicle as set forth in claim 3, in which: the said core has an abutment in its perimeter; the said spirally wound tube comprises at its inner end an end cap and means sealingly connecting it to said inner end, and at its outer end comprises a tube-end closure element and means connecting it to said fastening means.

5. A vehicle as set forth in claim 3, in which said fastening means comprises a ring around said outermost convolution and bonding material between said ring and outermost convolution.

6. A vehicle as set forth in claim 2 in which each of said convolutions is an annular tube, comprisng means sealingly joining ends of the tube.

7. A vehicle as set forth in claim 6, in which said means sealingly joining tube ends comprises a coupling and bondng material between said coupling and tube ends.

8. A vehicle as set forth in claim 2, in which: each of said tube-supporting elements further includes skin means flanking said nested tubular convolutions and bondng material between said last-named skin means and tubular convolutions.

9. A vehicle as set forth in claim 1, further including: floor-supporting tubes; tube-closing means sealingly closing each end of each floor tube; gas under above-atmospheric pressure in said floor tubes; and means fastening said tube-closing means to convolutions of said tube-supporting elements.

10. A vehicle as set forth in claim 9, in which said tube-closing means comprises tube-end portions flattened into substantially parallel plies and bonding material between said plies.

11. A vehicle as set forth in claim 1, in which: said frame comprises forward, middle and rearward parts; said vehicle skin means extends substantially streamlinedly from said forward portion to said rearmost portion; and said elongated tubes are contiguous to said skin means throughout their lengths.

12. A vehicle as set forth in claim 11, in which said lighter-than-air gas is in said middle part and within said assembly of elongated tubes.

13. A vehicle as set forth in claim 11, in which: said middle part comprises a central frame portion substantially inward of said vehicle skin means; and said lighter-than-air gas is between said central frame portion and said vehicle skin means.

14. A vehicle, adapted to move through the atmosphere, capable of taking off and landing with its fore-and-aft axis at a steep angle of inclination to a horizontal plane, including:
    a transparent windshield and rectangular windshield frame in the nose of the vehicle, the distance between at least two opposite portions of said windshield frame being less than any distance across the longitudinal axis of the vehicle at its middle part;
    a tubular body frame comprising: numerous elongated tubes arranged in an assembly around the longitudinal axis of the vehicle, each of said tubes having sealed tube-end portions; a plurality of tube-supporting elements within said assembly, extending transversely to said tubes; and means fastening said tubes to said tube-supporting elements; part of the forward portions of said body-frame tubes curvingly extending toward said axis and to said windshield frame, and part of the forward portions of said body-frame tubes curvingly extending outward from said axis and to said winshield frame.

15. A vehicle as set forth in claim 14, in which the said windshield frame has two opposite straight, parallel sides and two opposite curved sides.

16. A vehicle, including:
a tubular frame, comprising numerous elongated tubes having sealed tube-end portions, extending from a forward portion of said frame to its rearmost portion, arranged in an assembly around the longitudinal axis of the vehicle; gas under above-atmospheric pressure in said tubes; vehicle skin means inclosing said assembly, extending transversely to said axis, comprising nested inner and outer tubular convolutions, each of said inner convoltions being within and closely juxtaposed with one of said outer convolutions, gas under above-atmospheric pressure in said tubular convolutions, and fastening means connecting the outermost one of said convolutions to said elongated tubes;
a windshield frame at the forward end of the vehicle, and means fastening at least some of the forward ones of said sealed tube-end portions to said windshield frame; and
propulsion means for propelling said vehicle.

17. A vehicle as set forth in claim 16, in which said inner and outer convolutions comprise turns of an inflated tube; and each of said tube-supporting elements includes a disk-like core and means fastening the innermost one of said inner convolutions to said core.

18. A vehicle as set forth in claim 16, in which said inner and outer convolutions comprise a plurality of inflated tubes.

19. A vehicle, including:
a tubular frame comprising: numerous elongated tubes having sealed tube-end portions, extending from forward portions of said frame to its rear portion, including longer and shorter tubes, at least some of said shorter tubes being flanked by longer tubes, the said tubes being arranged in assembly around the longitudinal axis of the vehicle; gas under above-atmospheric pressure in said tubes; and vehicle skin means inclosing said assembly;
tube-supporting elements within said assembly, said elements including: means connecting together a rear group of said tube-end portions; a rib-like member in a forward portion of the vehicle, rearwardly spaced from the vehicle's forward end; means fastening a forward group of the sealed tube-end portions of said shorter tubes to said rib-like member; means fastening intermediate portions of said longer tubes to said rib-like member; a windshield frame at said forward end of the vehicle, having a dimension across it that is smaller than any dimension across a middle portion of said tubular frame; and means fastening a forwardmost group of said sealed tube-end portions to said windshield frame;
a transparent windshield in said windshield frame; and
means for propelling said vehicle.

20. A vehicle as set forth in claim 19, in which the said windshield frame has two opposite straight sides and two opposite curved sides.

21. A vehicle as set forth in claim 19, further including: aerostatic means, supported by said tubular frame and skin means, and having a center of lift that is forward of the vehicle's center of gravity; elevating means for lifting the rear portion of said vehicle in opposition to said lift of the aerostatic means; and controllable means for operating said elevating means and determining the amount of its lifting force on said rear portion.

* * * * *